United States Patent [19]

Dagenais

[11] Patent Number: 4,908,976

[45] Date of Patent: Mar. 20, 1990

[54] TUBULAR SHAPED VERMIN TRAP WITH INTERIOR ADHESIVE AND SUFFOCATION MEANS

[76] Inventor: Pierre Dagenais, 6024 Waverly St., Montreal, Canada, H2T 2Y3

[21] Appl. No.: 268,539

[22] Filed: Nov. 8, 1988

[51] Int. Cl.⁴ ............................................. A01M 25/00
[52] U.S. Cl. ........................................ 43/58; 43/115; 43/121; 43/131
[58] Field of Search .................. 43/58, 114, 115, 116, 43/131, 121

[56] References Cited

U.S. PATENT DOCUMENTS

| | | | |
|---|---|---|---|
| 3,398,478 | 6/1966 | Pearsall | 43/58 |
| 3,708,908 | 1/1973 | Levey | 43/115 |
| 4,132,026 | 1/1979 | Dodds | 43/131 |
| 4,244,134 | 1/1981 | Otterson | 43/114 |
| 4,281,471 | 8/1981 | Jenkins | 43/131 |
| 4,349,981 | 9/1982 | Sherman | 43/131 |

Primary Examiner—Nicholas P. Godici
Assistant Examiner—Michael W. Starkweather
Attorney, Agent, or Firm—Pierre Lesperance

[57] ABSTRACT

A trap for vermin is disclosed. It comprises an elongated tube open at both ends for animal vermin. The internal surface of the tube is coated with a pressure-sensitive adhesive, thereby causing a vermin which enters the trap to be caught by its paws and a substantial portion of its body. Sealing closures are then provided to close the tube. According to other embodiments, a smaller closed tube, having a plurality of holes, is used in a similar manner to get rid of insects. Or an adhesive-coated string is set up in a location where insects gather, the string being supported in a taut condition. A dispenser may be provided for such string.

2 Claims, 2 Drawing Sheets

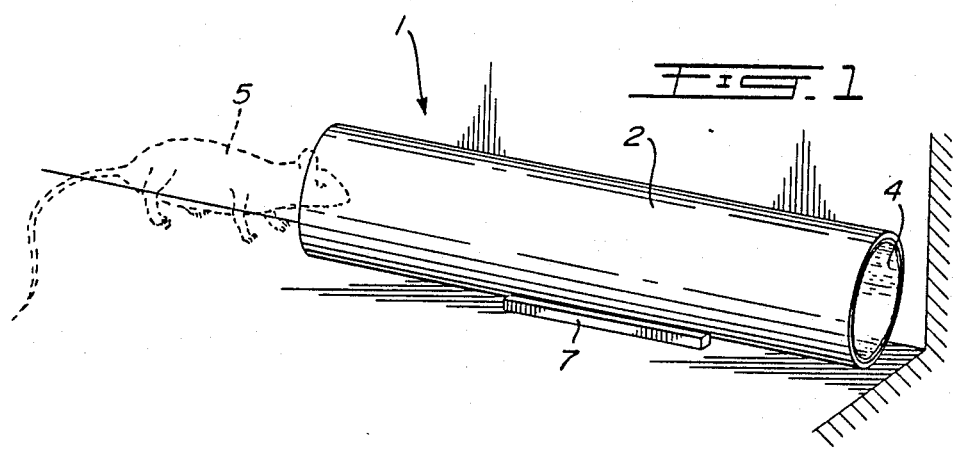
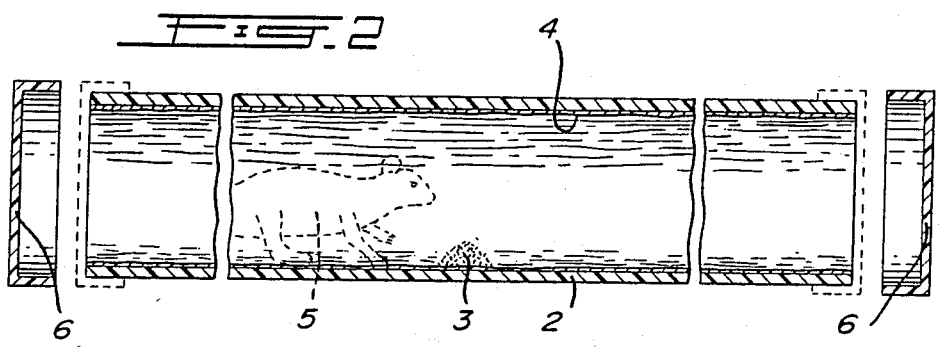
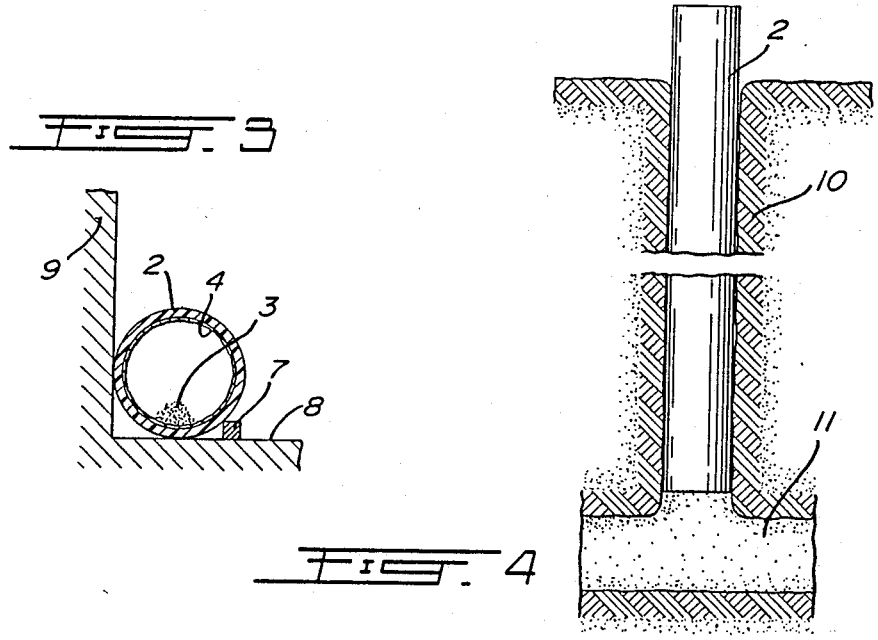

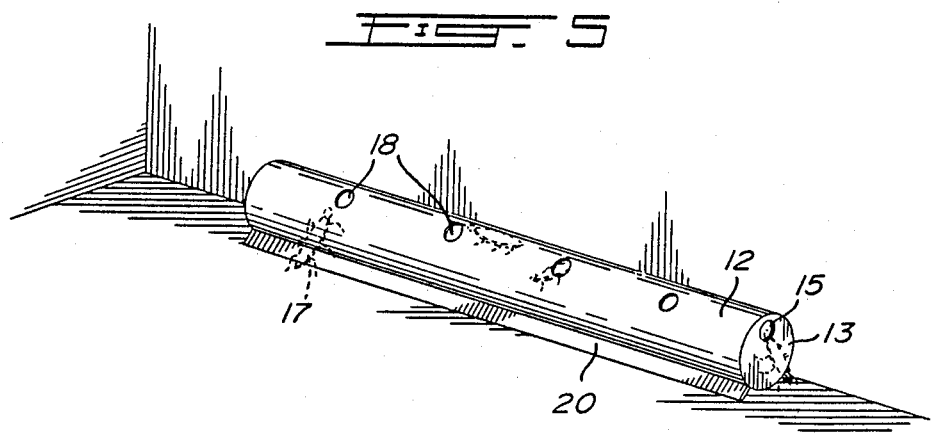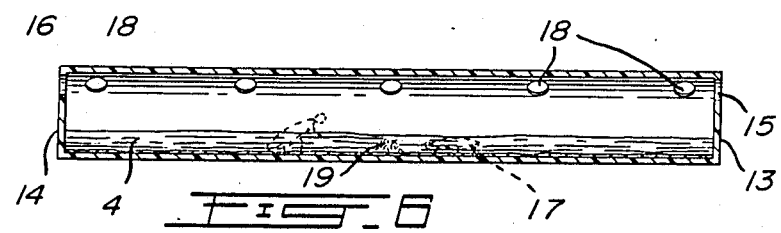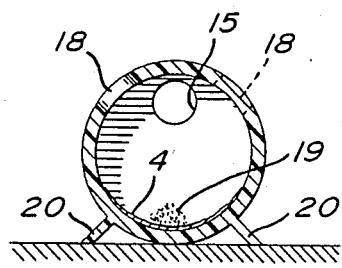

TUBULAR SHAPED VERMIN TRAP WITH INTERIOR ADHESIVE AND SUFFOCATION MEANS

FIELD OF THE INVENTION

The present invention relates generally to devices adapted to catch small animals and insects, more particularly to a trap for killing animal and insect pests.

BACKGROUND OF THE INVENTION

Animals, such as rats and mice, or insects such as flies and cockroaches are subject to extermination, because they contaminate food, carry dangerous diseases and damage property.

The usual approach to such pest control is to use lethal chemical poison or spring-type traps. If rodenticide poisons are use,, they may be hazardous for children. Spring traps are only effective from the bait-containing side. If anticoagulants are used, a rat or a mouse having ingested the same, will not die for several days, thereby increasing the risk of infectious disease through bacterial, viruses, etc. . . In addition, anticoagulants are inhumane. In the case of anti-insect poisons, the same hazard as above remains as regards children.

The prior art has had recourse to a plate covered with pressure-sensitive glue, in order to avoid the above disadvantages. If such plates (for insects, strips of glue-coated material) are provided with sufficiently-attractive bait stimulus, the rat or mouse, or bug, will be caught. However, it has been found that an animal pest can pull free of the glue, since only its paws are stuck to the plate. Moreover, even if the pest does not succeed in getting out of the glue, it remains alive and must be disposed of in another way.

OBJECTS OF THE INVENTION

In view of the above, it is an important object of the present invention to provide a vermin trap which effectively overcomes all of the drawbacks described.

It is another object of the present invention to provide a vermin trap of the character described, which is simple in design.

It is still another object of the present invention to provide a vermin trap of the character described, which is safe for any one to use.

SUMMARY OF THE INVENTION

The above and other objects and advantages of the present invention are realized according to preferred embodiments comprising: firstly, or animal vermin, an elongated hollow tube member, made of strong, lightweight material. The tube is open at both ends and at least the central portion of its interior surface is coated with a pressure sensitive adhesive. A food bait is provided in the midlength area of the tube.

Sealing closure means are provided at both ends of the tube and are adapted to be easily installed.

A vermin drawn by the bait enters the tube from either end. Once sufficiently inside the tube, it will come into contact with the pressure sensitive adhesive. To this end, it is essential that the tube be of a limited internal dimension, large enough to allow the rodent to enter and small enough to ensure that the pest entire body or a substantial part of it, and not just the paws, come into contact with the internal surface coating of the adhesive, thereby preventing any escape. Once thus caught, the two ends of the tube are sealed by the closure means, causing the vermin in the tube to suffocate. The tube may be then disposed of in an appropriate manner.

An insect vermin trap is also contemplated within the scope of the invention.

A first embodiment consists of another elongated tube of an internal dimension suited to insects. The two ends of the tube are closed but are each preferably provided with an aperture through which insects may enter. The upper surface of the tube may be provided with further spaced-apart openings suitably dimensioned for insects. Means are preferably provided to maintain the tube in immobile position at any selected location. At least the inner lower surface of the tube is coated with the same pressure-sensitive adhesive as described for animal vermin. The middle of the tube is also provided with an attracting bait. Insects are thus caught by the adhesive inside the tube, the latter being then disposed of.

BRIEF DESCRIPTION OF THE DRAWINGS

The above will be better understood by having reference to the preferred embodiments of the invention, illustrated by way of the accompanying drawings, in which:

FIG. 1 is a perspective view of an animal trap according to the invention, also showing a rat in dashed outline;

FIG. 2 is a longitudinal cross-section of said embodiment of FIG. 1, further showing the closure means at each end of the tube and a rat inside the tube;

FIG. 3 is a cross-sectional end view of the tube trap of FIG. 1, placed against a wall, further showing a restraining means and a bait;

FIG. 4 is an elevation of the embodiment of FIG. 1 installed in ground and communicating with a vermin tunnel;

FIG. 5 is a perspective view of a first embodiment of an insect vermin trap;

FIGS. 6 and 7 are a longitudinal section and a cross-section views similar to the views, respectively, of the insect trap of FIG. 5.

Like numerals indicate like elements throughout the drawings.

DETAILED DESCRIPTION OF THE PREFERRED EMBODIMENTS

Referring firstly to FIGS. 1 to 4, there is shown a preferred embodiment of a trap 1 for animal vermin, such as rats and mice. Trap 1 is in the shape of an elongated tube 2, which is open at both ends and is preferably made of a suitable plastic. The midlength area of the tube is provided with a food bait 3 to attract the vermin.

Preferably, the entire interior surface of the tube is coated with a pressure-sensitive adhesive 4, such as the adhesive Helmitherm F40-159 produced by Helmitin canada Inc. Thus, as shown in FIG. 2, a rat 5 enters the tube and is caught by the adhesive not only by its paws but by a substantial portion of its body, as it tries to reach bait 3. It will be clear that the tube diameter cannot vary beyond a certain range, either larger or smaller, if the trap is to be effective.

It is to be noted that the form of a tube is preferable for the invention over other forms, because rats and mice scurry through natural or animal-made generally circular tunnels. The tube therefore creates an added enticement.

Both ends of tube 2 are provided with releasable, air-tight closure caps 6. Once the vermin is stuck in the tube 2, such caps are frictionally secured onto the ends of the tube, thereby suffocating the undesirable pest. It is then easy to dispose of the entire tube and caps in an appropriate manner.

Since rats and mice skulk near walls and baseboards indoors and make tunnels outdoors, it is contemplated to install the trap as shown in FIGS. 3 and 4, respectively. To prevent the tube from rolling out of position, a restraining means, consisting of a small bar 7, may be secured to a floor 8, so that it contacts tube 2, the latter also contacting a wall 9, as shown in FIG. 3. Or, as in FIG. 4, tube 2 may be installed in ground 10, such that the lower end communicates with a rat tunnel 11, the other end opening exteriorly of the ground.

Referring now to FIGS. 5 to 7 inclusively, there is shown a first embodiment of the invention designed to rid an area of insect vermin. Similar to the above-described tube 2, this embodiment consists of an elongated hollow tube 12, having closed end faces 13 and 14. The latter are each provided with uppermost apertures 15 and 16 to allow insects, such as cockroaches 17, to enter the tube. The upper surface portion of tube 12 is further provided with two rows of a plurality of spaced-apart entry holes 18.

Again the middle portion of the tube is provided with a suitable bait 19 to attract insects into the tube. The exterior lower surface portion of the tube is coated with the same pressure-sensitive adhesive 4, as described above. (Only the lower surface is coated in this embodiment to ensure that insects are completely inside the tube before they contact the adhesive.

Stabilizing means for tube 12 are provided, consisting of a pair of radially-projecting lower longitudinal flanges 20, preferably integrally formed with the tube.

What I claim is:

1. A vermin trap for animals comprising: an elongated tube member open at both ends, said tue member being limited in internal dimension between small and large dimension limits according to the size of the animal pest it is desired to trap, pressure-sensitive adhesive coating at least the central portion of the interior surface of said tube; bait means located inside the tube to lure a said pest; sealing-closure means at each end of said tube, whereby a pest caught and immobilized by said adhesive in the tube is suffocated by the closure means wherein said sealing closures means consists of air-tight caps frictionally attachable to both said ends of said tube.

2. A vermin trap as defined in claim 1, wherein retaining means are provided to maintain the tube from rolling out of position.

* * * * *